United States Patent
Malpass et al.

(10) Patent No.: US 6,946,183 B2
(45) Date of Patent: *Sep. 20, 2005

(54) SLIP RESISTANT MAT

(75) Inventors: Ian S. Malpass, Alpharetta, GA (US); Jeffrey L. Cofer, Conyers, GA (US)

(73) Assignee: The Millennium Mat Company, LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/662,956

(22) Filed: Sep. 15, 2003

(65) Prior Publication Data

US 2005/0100711 A1     May 12, 2005

Related U.S. Application Data

(63) Continuation of application No. 10/132,008, filed on Apr. 25, 2002, now Pat. No. 6,656,562, which is a continuation-in-part of application No. 09/717,553, filed on Nov. 21, 2000.

(51) Int. Cl.$^7$ .......................... B32B 3/02; A47K 3/02; A47G 9/06
(52) U.S. Cl. .................. 428/99; 428/156; 428/212; 5/581; 5/583; 4/417
(58) Field of Search .................. 428/156, 99, 158, 428/159, 212, 218; 5/417; 248/206.2, 206.3; 4/581, 582, 583, 657; 264/239; 156/60, 242

(56) References Cited

U.S. PATENT DOCUMENTS

| | | |
|---|---|---|
| 1,190,179 A | 7/1916 | Livingston |
| 1,201,256 A | 10/1916 | Clarke |
| 1,613,158 A | 1/1927 | Brewer |
| D85,859 S | 12/1931 | Capouch |
| 1,939,293 A | 12/1933 | Cavanagh et al. .............. 154/2 |
| 2,081,992 A | 6/1937 | Gavlak |
| 2,084,126 A | 6/1937 | Bogar et al. |
| 2,217,821 A | 10/1940 | Shiner |
| 2,466,502 A | 4/1949 | Stiller |
| 2,471,008 A | 5/1949 | Pretty |
| 2,512,310 A | 6/1950 | Corson |
| 2,681,865 A | 6/1954 | Heine |
| 3,034,140 A | 5/1962 | Reynolds |
| 3,076,976 A | 2/1963 | Bogar et al. |
| 3,251,076 A | 5/1966 | Burke |
| 3,418,668 A | 12/1968 | Anderson et al. |
| D238,538 S | 1/1976 | Smith |
| 4,010,302 A | 3/1977 | Anderson et al. |
| 4,361,614 A | 11/1982 | Moffitt, Jr. |
| 4,415,620 A | 11/1983 | Yamazaki et al. .......... 428/157 |
| 4,528,231 A | 7/1985 | Lund |
| 4,557,475 A | 12/1985 | Donovan |
| 4,622,260 A | 11/1986 | Tesch |

(Continued)

FOREIGN PATENT DOCUMENTS

| | | |
|---|---|---|
| WO | WO 04/004532 | 1/2004 |

OTHER PUBLICATIONS

Websters II New Riverside University Dictionary, 1984, p. 342.*

*Primary Examiner*—Donald J. Loney
(74) *Attorney, Agent, or Firm*—King & Spalding LLP

(57) ABSTRACT

A slip resistant floor mat composed of one or more layers of material the bottom layer of which incorporates a plurality of recessions with inset suction cups in the bottom surface of the bottom layer that comes into contact with the intended surface, such as a floor.

15 Claims, 4 Drawing Sheets

U.S. PATENT DOCUMENTS

| | | |
|---|---|---|
| 4,637,942 A | 1/1987 | Tomarin |
| 4,804,567 A | 2/1989 | Reuben |
| 4,829,627 A | 5/1989 | Altus et al. |
| 5,016,191 A | 5/1991 | Radochonski ............... 364/518 |
| 5,024,868 A | 6/1991 | Petersen ..................... 428/88 |
| 5,198,278 A | 3/1993 | Sumimoto et al. |
| 5,305,565 A | 4/1994 | Nagahama |
| 5,456,966 A | 10/1995 | Austin |
| 5,482,754 A | 1/1996 | Crook |
| 5,613,332 A | 3/1997 | Saylor, Jr. |
| 5,778,609 A | 7/1998 | Pawson |
| 5,815,995 A | 10/1998 | Adam |
| 5,882,764 A | 3/1999 | Kessler |
| 5,887,416 A | 3/1999 | Shimono et al. ............. 57/236 |
| 5,958,538 A | 9/1999 | Kessler |
| D414,973 S | 10/1999 | Craft et al. |
| 6,014,779 A | 1/2000 | Lindholm |
| 6,022,608 A | 2/2000 | Dell'Acqua |
| 6,042,915 A | 3/2000 | Kessler |
| 6,068,908 A | 5/2000 | Kessler |
| 6,114,014 A | 9/2000 | Ikeda et al. |
| 6,120,872 A | 9/2000 | Deshon |
| 6,132,846 A | 10/2000 | Wang et al. |
| 6,289,528 B1 | 9/2001 | Ridder et al. |
| 6,414,693 B1 | 7/2002 | Berger et al. ............... 345/641 |
| 6,656,562 B2 | 12/2003 | Malpass et al. |
| 6,726,190 B2 | 4/2004 | Malpass et al. |
| 2002/0114926 A1 | 8/2002 | Malpass et al. |
| 2003/0139840 A1 | 7/2003 | Magee et al. ............... 700/133 |

* cited by examiner

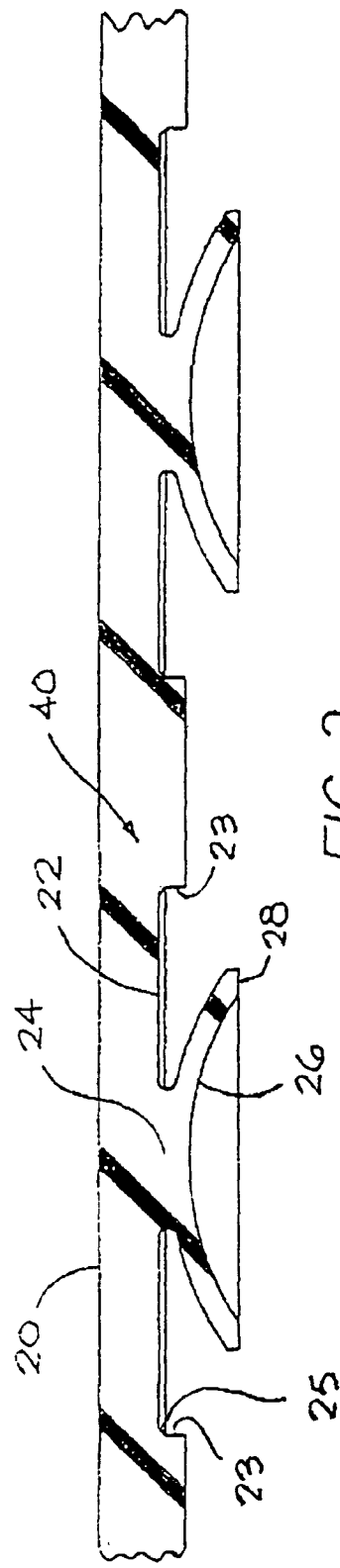
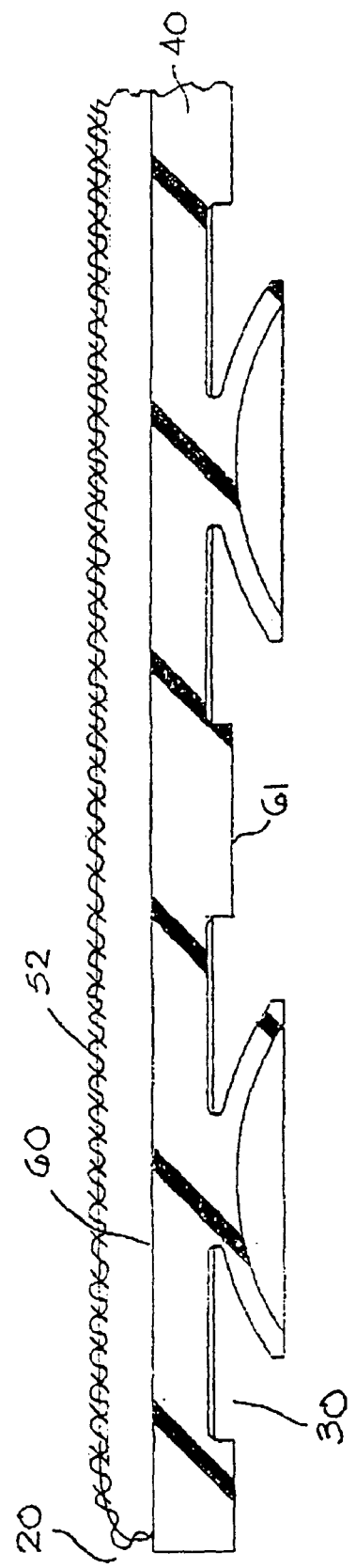
FIG. 2
FIG. 3

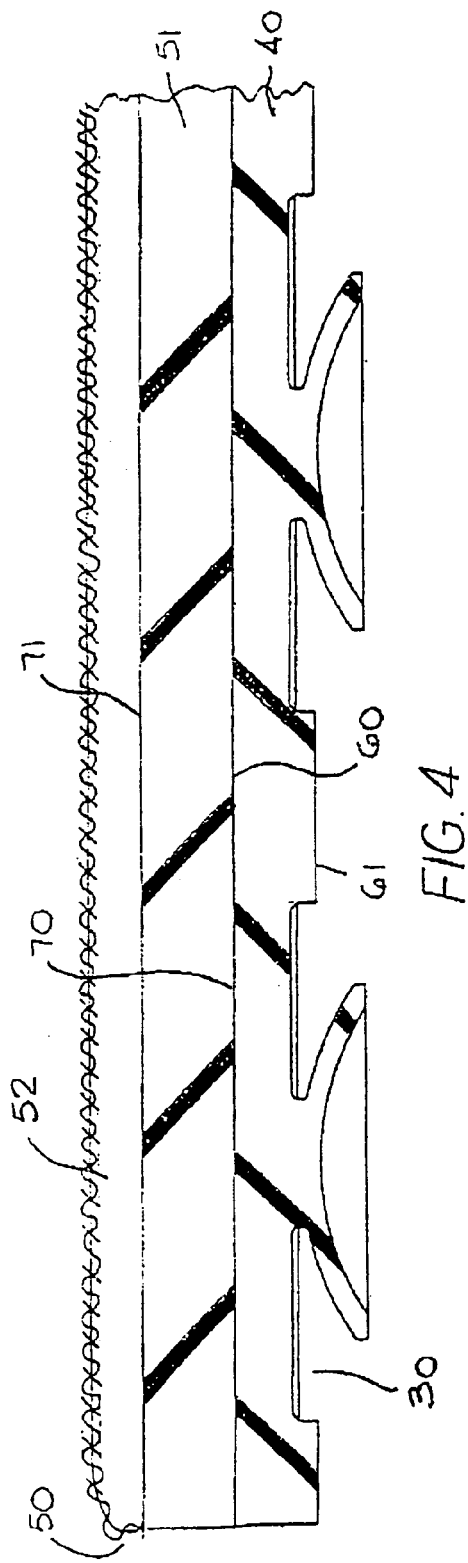
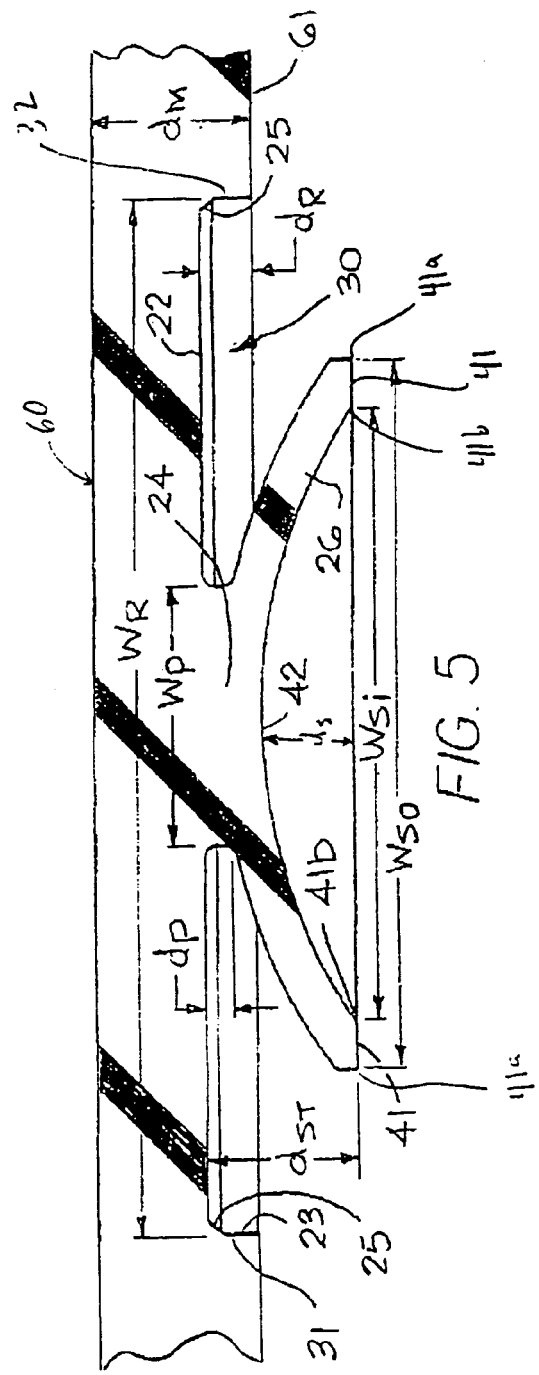
FIG. 4
FIG. 5

SLIP RESISTANT MAT

This application is a continuation of and claims priority to U.S. application Ser. No. 10/132,008 filed Apr. 25, 2002, now U.S. Pat. No. 6,656,562, entitled, "Slip Resistant Mat," which is a continuation-in-part of U.S. application Ser. No. 09/717,553, filed Nov. 21, 2000. The entire contents of U.S. application Ser. No. 10/132,008 are hereby incorporated by reference.

FIELD OF INVENTION

This invention relates generally to slip resistant, anti-skid or anti-creep mats.

BACKGROUND OF THE INVENTION

In the past, floor mats, consisting of rubber backed carpet tuft, were made with either a smooth back, primarily for solid or non carpeted floors, or with a variety of "grippers" or "cleats" arranged to reduce the movement on carpeted floors. However, both of these approaches resulted in floor mats that were not skid resistant on smooth floors, especially those floors with high traffic areas or loads being moved over them. The movement of the mat in the gripper/cleat mat design results from the force of foot and vehicle traffic on the mat which causes a deformation around the compressed area and then upon removal of such force the mat returns to a different position. For the smooth back mats, movement of the mat results from similar forces and the lack of any device or feature intended to secure the mat in place.

A number of approaches have been taken to attempt to reduce the movement of mats. One known approach to the problem is to fasten the mat to the intended surface by various devices, such as that suggested by Kessler in U.S. Pat. No. 6,068,908 which utilizes a system by which a mat is fastened to the surface using a clip system. While this approach is well-developed, it results in floor mats that are difficult or impossible to move from place to place and the structures required to attach the mat add cost to the mat and difficulty to the installation. Also, attached mats are more rigid.

Another approach involves the use of a frame into which the mat is placed, such as the frames used by Moffitt, Jr. in U.S. Pat. No. 4,361,614 and Kessler in U.S. Pat. No. 6,042,915. The frame can be located upon the flooring surface or inlaid to be flush with the flooring surface. In either circumstance, unless the frame is fastened as mentioned above or embedded in the surface, the frame still has a tendency to shift on the surface. If the frame is fastened or embedded, the other problems mentioned above still remain.

Another approach involves the use of suction cups, such as those commonly found on shower and bath mats, examples of which can be found by Lindholm in U.S. Pat. No. 6,014,779 in which the corners of a rectangular mat are held by four suction cups and by Gavlak in U.S. Pat. No. 2,081,992 in which a plurality of suctions cups hold the bathtub mat to the surface. While this approach provides acceptable slip-resistance for light shower and bath mat applications, traditional suctions cups are not sufficient to provide sufficient anti-skidding forces to prevent slipping and movement in high traffic and high load areas. Traditional suction cups also result in a wavy mat surface which is more difficult for individuals and loads to traverse.

As mentioned, existing approaches to reducing movement of mats include significant limitations. Further, the known approaches require additional space, components, installation effort and expense. As a result, significant improvement can still be made relative to reducing the movement of mats.

SUMMARY OF THE INVENTION

The object of the present invention is to utilize recessions formed on the underside of the mat coupled with suction cups to reduce movement of the mat on the intended surface, typically floors. The present invention utilizes a plurality of recessions with partially inset suction cups to reduce the movement of the mat. The recessions have a suction cup set inside the recession and the top surface of the recession is connected with the top surface of the suction cup, either directly or by using a supporting pillar. Upon an initial force being applied to the mat, such as a footstep or vehicular traffic, the suction cup is deformed and the air is forced out of the suction cup which creates a low pressure area or near vacuum inside of the suction cup, thereby providing a force that acts to adhere the mat to the surface and assist in retaining the mat in its original position. As the force over a particular recession increases, if the force is sufficiently large, the suction cup will deform itself into the recession, and the recession itself will receive a compression force that will create a low pressure area or near vacuum inside the recession being impacted against the surface on which the mat rests. At the same time, as a result, the low pressure areas of both the recessions and suction cups then create forces that act to oppose the lateral motion of the mat that would otherwise result from the applied forces.

The size and shape specifications of the recessions and suction cups can be varied and they can be positioned in a variety of arrangements. The recessions can be any shape that is formed on the underside of the mat, does not extend through the top of the mat (i.e., is contained within the mat), and adjoins the floor in a continuous manner to permit the formation of a low pressure area or near vacuum. The suction cups are at least partially inset into the recessions and can be any shape provided that the edges of the suction cups contact the surface on which the mat rests prior to the full compression of the recessions. In one embodiment, the recessions are cylinders or recessed circles having a width of 2.5 cm and a depth of 0.125 cm, the circular pillar connecting the recessions and the suction cups has a width/diameter of 0.625 cm and a depth/thickness of 0.0802 cm, the suction cup and pillar have a cumulative depth of 0.375 cm from the top surface of the recession, and the suction cup has an inner depth of 0.20 cm, an edge to edge width of 1.62 cm, and a contacting surface lip width of 0.12 cm. Also, in one embodiment, the recessions are positioned in evenly spaced parallel and perpendicular rows resulting in an evenly spaced grid arrangement, although they can be spaced in an infinite number of combinations. In one embodiment, the pattern does not extend to the edge of the mat in order to prevent tearing and permit the edge of the mat to be uniformly thick. Further, in one embodiment, the top surfaces of the recessions are connected to the side surfaces of the recessions by an angled edge, which serves to add structural integrity to the mat and decrease the volume of the recessions, thereby decreasing the volume of air needing to be expelled to create a low pressure or near vacuum area and increasing the surface adhesion of the mat.

In another embodiment, the recessions and suction cups are different sizes and shapes. The existence of multiple sizes and shapes of recessions and suction cups permits improved performance on a variety of floor surfaces since larger recession an suction cup units perform better on some surfaces and smaller recessions and suction cup units perform better on others.

In another embodiment, the recessions and suction cups are formed in a base layer of material and then the base layer of material is laminated to one or more other top layers of material. While the layers can be made from different materials, the base layer and any intermediate layers are typically sheets of rubber and the uppermost of the top layers is a union of a rubber sheet with carpet, yarn or other fabric on top. The base layer can be formed from a soft, low durometer rubber compound, such as LD-35, by being plied to a T6 aluminum mold to form the recessions and the suction cups. This base layer is then laminated with one or more upper layers formed from Millennium Mat MM-170 rubber compound with the uppermost layer bonded with a yarn/carpet material. In this embodiment, after lamination of the layers, the laminated sheet is pricked to avoid the accretion of gases during the curing process. Also, if desired, additives can be introduced to the mat to make it anti-bacterial.

One advantage of the present invention is that the mat resists slipping to a much greater extent than existing mat designs. Another advantage of the invention is that the edges of the mat are more stable and therefore it is less of a tripping hazard or obstacle than traditional mats in which the edge of the mat easily rolls up onto or under the mat. Another advantage is that it provides the enhanced slip-resistance without adding any weight or installation complexity to existing mat designs. Another advantage is that the invention does not require any permanent fastening means and is therefore easy to move to different locations. Another advantage is that the recessions provide some additional cushioning for pedestrian and vehicular traffic. Another advantage is that the cushioning of the recessions and suction cups yields an anti-fatigue effect, thereby resulting in reduced wear and tear and routine maintenance and increased user comfort, especially for locally stationed employees spending long period of time on the mat. Another advantage of the invention is that the slip-resistance is effective on a wide variety of surfaces because recession and suction cup combination and the use variable spaced, sized and shaped recessions.

BRIEF DESCRIPTION OF THE DRAWINGS

FIG. 2 is a fragmentary side elevational view of one embodiment of the present invention taken across Line 2—2.

FIG. 3 is a fragmentary side elevational view of another embodiment of the present invention taken across Line 2—2.

FIG. 4 is a fragmentary side elevational view of another embodiment of the present invention taken across Line 2—2.

FIG. 5 is a fragmentary side elevational view of a single recession, pillar and suction cup group in one embodiment of the present invention.

DETAILED DESCRIPTION

Figure 1:
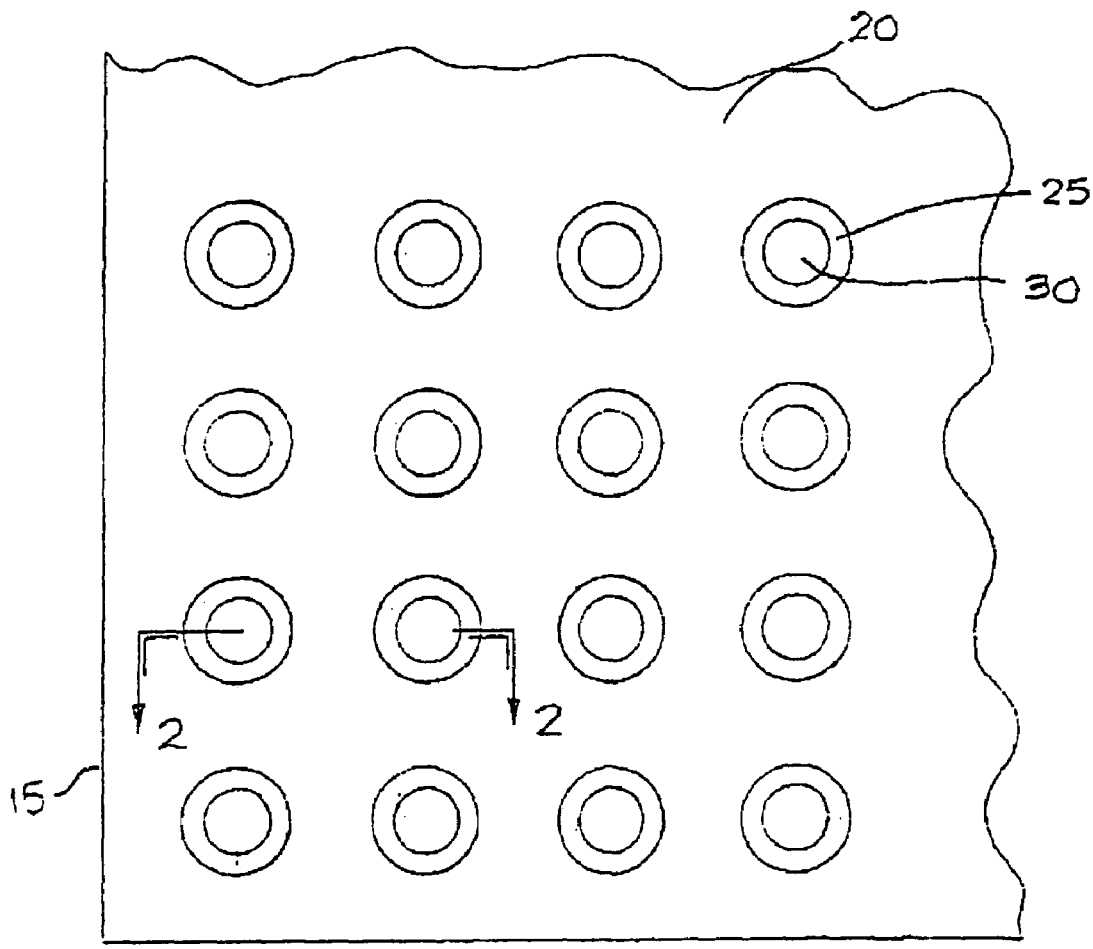
FIG. 1 is a bottom fragmentary view of one embodiment of the present invention.

FIG. 1 illustrates a portion of a mat 20 with a plurality of recessions 25 and inset suction cups 30 that extend nearly to the edge of the mat 15.

FIG. 2 illustrates a view of a cross-section of a single layer mat 20. The mat 20 has a single layer 40 which contains recessions 30 in the underside 61 of the bottom layer 40. Pillars 24 connect the recession top surfaces 22 to suction cups 26 that have contacting edges 28 that make contact with the surface on which the mat 20 rests. The recession top surfaces 22 are joined to the recession side surfaces 23 by recession angled edges 25.

FIG. 3 illustrates a view of a cross-section of a layered mat 20. The mat 20 has a single bottom layer 40 which contains recessions 30 in the underside 61 of the bottom layer 40. Pillars 24 connect the recession top surfaces 22 to suction cups 26 that have contacting edges 28 that make contact with the surface on which the mat 20 rests. The recession top surfaces 22 are joined to the recession side surfaces 23 by recession angled edges 25. The bottom layer has a yarn, carpet or other fabric layer 52 laminated or otherwise bonded to the upper surface 60 of the bottom layer 40.

FIG. 4 illustrates a view of a cross-section of a multi-layer laminated mat 20 comprised of a bottom layer 40 and an upper layer 50. The upper surface 60 of the bottom layer 40 is laminated to or otherwise bonded with the lower surface 70 of the support layer 51 of the upper layer 50. The upper layer 50 has a yarn, carpet or other fabric layer 52 laminated or otherwise bonded on the upper surface 71 of the support layer 51. The bottom layer 40 contains recessions 30 in the underside 61 of the bottom layer 40. Pillars 24 connect the recession top surfaces 22 to suction cups 26 that have contacting edges 28 that make contact with the surface on which the mat 20 rests. The recession top surfaces 22 are joined to the recession side surfaces 23 by recession angled edges 25.

FIG. 5 is an unscaled depiction of a single recession 30, pillar 24 and suction cup 26 unit in the mat 20. The recession 30 has a width $w_R$ extending from the left edge 31 to the right edge 32 and a depth $d_R$ extending from the recession top surface 22 to the underside 61 which is less than the depth $d_M$ of the mat 20 extending from the upper surface 60 to the underside 61. The suction cup 26 is attached to the recession top surface 22 by a pillar 24 which has a width $w_P$ and a depth $d_P$. The suction cup has a depth $d_S$ extending from the suction cup inner top edge 42 to the surface on which the mat 20 rests, an outer width $w_{SO}$ extending across the outer edges 41a of the suction cup bottom edge 41 and an inner width $w_{SI}$ extending across the inner edges 41b of the suction cup bottom edge 41. The suction cup 26 has a volume $v_S$ enclosed between the suction cup inner edges 41b and the surface on which the mat 20 rests. The entire structure of the pillar 24 and suction cup 26 has a depth $d_{ST}$ extending from the recession top surface 22 to the surface on which the mat 20 rests that is flush with the suction cup bottom edge 41. The recession top surface 22 is joined with the recession side surface 23 by recession angled edges 25.

Figure 6A:
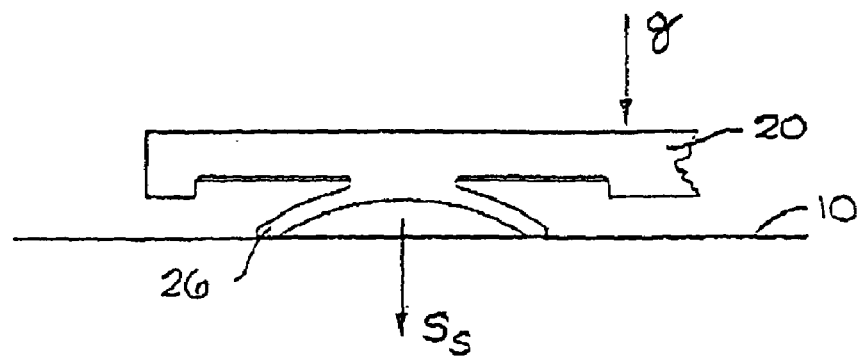
FIGS. 6A, 6B, 6C and 6D are a fragmentary side elevational view of a single recession in one embodiment and the forces impacting such recession.
Figure 6B:
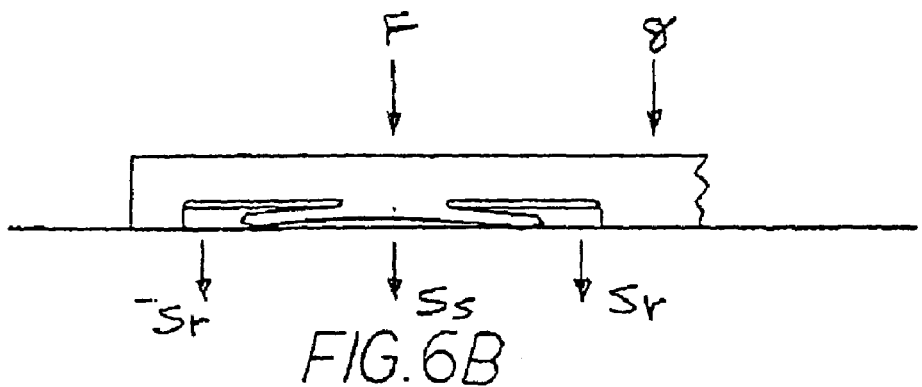
Figure 6C:
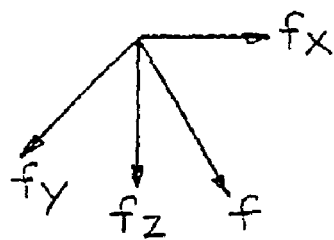
Figure 6D:
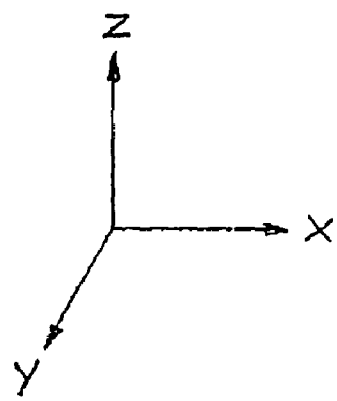

FIGS. 6A & 6B each depict an unscaled single recession 30, pillar 24 and suction cup 26 unit in a mat 20. FIG. 6A depicts the unit at rest without the impact of any external force f. FIG. 6B depicts the unit being impacted and compressed by a force f. As foot or vehicle traffic impacts the mat 20, a force f is applied to the mat 20. In the vast majority of circumstances the force f does not impact the mat 20 in a completely vertical or horizontal manner; hence the force f consists of both horizontal force components f(x) and f(y) and a vertical force component f(z). The vertical force component f(z) created by the force f and the gravitational force g, act together to press the mat down against the surface 10 and hold the mat 20 against the surface 10 as is the case in all traditional mats. Further, the vertical force component f(z) acts to compress the suction cup 26 against the surface 10 thereby evacuating the air in the suction cup volume $v_S$ and creating a near vacuum or low pressure area in the volume $v_S$ which results in an effective resistant downward suction cup force $s_S$. Additionally, if sufficient force exists, as the suction cup 26 is being compressed the vertical force component f(z) also compresses the recession 30 against the surface 20 thereby creating a low pressure area or near vacuum in the recession 30 between the mat 20 and the surface 10 which results in an effective resistant downward recession force $S_R$. The downward suction cup force $S_S$ and downward recession forces $S_R$ act in combination with the vertical force component f(z) and gravitational force g to oppose the horizontal force components f(x) and f(y) that would otherwise result in lateral movement of the mat 20.

The preceding description of the invention has shown and described certain embodiments thereof; however, it is intended by way of illustration and example only and not by way of limitation. Those skilled in the art should understand that various changes, omissions and additions may be made to the invention without departing from the spirit and scope of the invention.

We claim:

1. A mat comprising:
   a substantially cylindrical cavity having at least one side wall and a base wall formed within a surface of a material; and
   a suction cup with a contacting edge formed by the material, the suction cup being coupled to the base wall of the substantially cylindrical cavity and enclosed by the substantially cylindrical cavity, the contacting edge projecting below the surface of the material in a non-contacting state.

2. The mat of claim 1, wherein the substantially cylindrical cavity has a depth and the material has a thickness, the depth of the substantially cylindrical cavity being substantially less than the thickness of the material.

3. The mat of claim 1, wherein the substantially cylindrical cavity has a depth and the suction cup has a thickness, the depth of the substantially cylindrical cavity being one of greater than and substantially equal to the thickness of the suction cup when the suction cup is in a compressed state.

4. The mat of claim 1, wherein the material is formed of a rubber.

5. The mat of claim 1, wherein the material is formed of a plastic.

6. A mat comprising:
   a substantially cylindrical hollow region having at least a base portion and a lateral portion formed within a surface of a material; and
   a suction cup with an edge for contacting surfaces formed by the material and coupled to the base portion of the substantially cylindrical hollow region and enclosed by the substantially cylindrical hollow region, the edge for contacting surfaces projecting below the surface of the material in absence of any surfaces.

7. The mat of claim 6, wherein the substantially cylindrical hollow region has a depth and the material has a thickness, the depth of the substantially cylindrical hollow region being substantially less than the thickness of the material.

8. The mat of claim 6, wherein the substantially cylindrical hollow region has a depth and the suction cup has a thickness, the depth of the substantially cylindrical hollow region being one of greater than and substantially equal to the thickness of the suction cup when the suction cup is in a compressed state.

9. The mat of claim 6, wherein the material is formed of a rubber.

10. The mat of claim 6, wherein the material is formed of a plastic.

11. A method for reducing slippage of a mat comprising:
    forming a substantially circular recession with a wall and a base in a material;
    forming a suction cup having a contacting edge with the material;
    attaching a convex surface of the suction cup to the base of the substantially circular recession so that the contacting edge projects below the surface of the material in an uncompressed state;
    coupling a concave surface of the suction cup to a surface; and
    enclosing the entire suction cup with the substantially circular recession when the material is compressed.

12. The method of claim 11, further comprising forming the substantially circular recession with a depth that is one of greater than and substantially equal to a thickness of the suction cup in a compressed state.

13. The method of claim 11, further comprising forming the material with a thickness that is substantially greater than a depth of the substantially circular recession.

14. The method of claim 11, further comprising forming the material with rubber.

15. The method of claim 11, further comprising forming the material with plastic.

* * * * *